US012459142B1

(12) United States Patent
Yan et al.

(10) Patent No.: US 12,459,142 B1
(45) Date of Patent: Nov. 4, 2025

(54) FOUR-WAY SWING STRUCTURE OF SHAVER HEAD

(71) Applicant: Jiangxi Xirui Manufacturing Co., Ltd, Ganzhou (CN)

(72) Inventors: Caimin Yan, Liling (CN); Jianhong Chen, Ganzhou (CN)

(73) Assignee: JIANGXI XIRUI MANUFACTURING CO., LTD, Ganzhou (CN)

( * ) Notice: Subject to any disclaimer, the term of this patent is extended or adjusted under 35 U.S.C. 154(b) by 0 days.

(21) Appl. No.: 18/960,122

(22) Filed: Nov. 26, 2024

(30) Foreign Application Priority Data

Oct. 28, 2024 (CN) ........................ 202422596050.2

(51) Int. Cl.
*B26B 21/22* (2006.01)
*B26B 21/52* (2006.01)

(52) U.S. Cl.
CPC .......... *B26B 21/225* (2013.01); *B26B 21/521* (2013.01)

(58) Field of Classification Search
CPC ..... B26B 21/225; B26B 21/521; B26B 21/06; B26B 21/14; B26B 21/16; B26B 21/22; B26B 21/40; B26B 21/4012; B26B 21/52
USPC ................................................ 30/527, 47–51
See application file for complete search history.

(56) References Cited

U.S. PATENT DOCUMENTS

| | | | | |
|---|---|---|---|---|
| 1,958,271 A * | 5/1934 | Holtzman | B26B 21/14 | 30/41.7 |
| 3,052,979 A * | 9/1962 | Grassau | B26B 21/52 | 30/67 |
| 4,797,998 A * | 1/1989 | Motta | B26B 21/225 | 30/530 |
| 5,784,790 A * | 7/1998 | Carson, III | B26B 21/522 | 30/527 |
| 5,787,586 A * | 8/1998 | Apprille, Jr. | B26B 21/225 | 30/47 |
| 5,953,824 A * | 9/1999 | Ferraro | B26B 21/225 | 30/527 |
| 7,200,942 B2 * | 4/2007 | Richard | B26B 21/225 | 30/526 |
| 8,205,344 B2 * | 6/2012 | Stevens | B26B 21/225 | 30/526 |
| 9,796,101 B2 | 10/2017 | Haba | | |
| 10,668,634 B2 | 6/2020 | Chan | | |
| 2004/0216311 A1 * | 11/2004 | Follo | B26B 21/528 | 30/526 |

(Continued)

*Primary Examiner* — Adam J Eiseman
*Assistant Examiner* — Fred C Hammers

(57) ABSTRACT

The present invention relates to a four-way swing structure of a shaver head, which includes: a shaver handle body, wherein a front end of the shaver handle body is provided with a clamping groove, a top and a bottom of the clamping groove are symmetrically provided with a first pin hole, and a bottom wall of the clamping groove is provided with two insertion holes; and a push-in mechanism assembly, wherein the push-in mechanism assembly includes a push-in mechanism, the push-in mechanism is partially positioned in the clamping groove, a second pin hole is vertically provided in a front end of the push-in mechanism, a pin is rotatably connected in the second pin hole, and two ends of the pin are each fixedly connected in the first pin hole. The present invention relates to the technical field of shavers.

10 Claims, 5 Drawing Sheets

(56) References Cited

U.S. PATENT DOCUMENTS

| | | | | |
|---|---|---|---|---|
| 2005/0198841 | A1* | 9/2005 | Worrick, III | B26B 21/4031 30/527 |
| 2008/0250646 | A1 | 10/2008 | Nakasuka | |
| 2010/0175263 | A1* | 7/2010 | Shimizu | B26B 19/048 30/45 |
| 2011/0239475 | A1* | 10/2011 | Efthimiadis | B26B 21/521 30/526 |
| 2012/0073150 | A1* | 3/2012 | Murgida | B26B 21/521 30/526 |
| 2018/0085940 | A1 | 3/2018 | Krauss et al. | |

* cited by examiner

FOUR-WAY SWING STRUCTURE OF SHAVER HEAD

CROSS-REFERENCE TO RELATED APPLICATIONS

The application of Chinese patent application CN2024225960502, filed on Oct. 28, 2024, which is incorporated herein by reference in its entireties.

TECHNICAL FIELD

The present invention relates to the technical field of shavers, and in particular, to a four-way swing structure of a shaver head.

BACKGROUND

According to the shaving and movement principle of a manual shaver, a surface of a shaver head fits a cheek, the shaver head and a blade are laterally arranged (that is, a direction of a blade edge is perpendicular to a shaving direction), and a beard is cut off from a root by utilizing direct contact between the blade and the skin along the face to be trimmed.

In the conventional manual shavers on the market, shaver heads in most of the shavers rotate at a certain angle by swinging up and down around a support point to fit a facial contour and achieve the purpose of shaving. The movement direction of this structure does not fundamentally solve the problem of difficulty of shaving grip structurally, and the shaver head has no effect of automatically correcting left and right directions, which poses a safety hazard during shaving.

Therefore, it is particularly important to design a structure of a manual shaver head that can rotate by swinging up and down and left and right to reduce the difficulty of manual shaving and the potential safety hazards during shaving.

SUMMARY

In view of the defects in the prior art, an objective of the present invention is to provide a four-way swing structure of a shaver head, so as to solve the technical problems mentioned in the above background.

The technical objective of the present invention is achieved by the following technical solution.

A four-way swing structure of a shaver head includes a shaver handle body, wherein a front end of the shaver handle body is provided with a clamping groove, a top and a bottom of the clamping groove are symmetrically provided with a first pin hole, and a bottom wall of the clamping groove is provided with two insertion holes;

- a push-in mechanism assembly, wherein the push-in mechanism assembly includes a push-in mechanism, the push-in mechanism is partially positioned in the clamping groove, a second pin hole is vertically provided in a front end of the push-in mechanism, a pin is rotatably connected in the second pin hole, and two ends of the pin are each fixedly connected in the first pin hole;
- a U-shaped elastic piece, wherein a U-shaped assembly groove is provided in a bottom middle position of the push-in mechanism, a rotating section of the U-shaped elastic piece is assembled in the U-shaped assembly groove, and an extending section of the U-shaped elastic piece is horizontally inserted into the insertion hole; and

- a shaver head assembly, wherein the shaver head assembly includes a horn connector and a shaver head, the shaver head is rotatably connected to the horn connector, a slot is provided on one side of the horn connector away from the shaver head, and the slot is connected to the push-in mechanism through a first clamping piece.

Further, the push-in mechanism assembly further includes a pushing part, a floating part, and an ejecting part, a through groove is provided on one side of the push-in mechanism close to the insertion hole, the floating part is slidably connected in the through groove, an ejecting groove is concavely provided in one side of the floating part away from the shaver handle body, a front section of the ejecting groove is slidably connected to the ejecting part, a rear section of the ejecting groove is connected to a spring, the spring is fixedly connected to the ejecting part, the pushing part is positioned above the shaver handle body, a bottom of the pushing part is inserted into the clamping groove downwards and is connected to the floating part by a second clamping piece.

Further, the second clamping piece includes a shifting block and a stop block, a bottom of the pushing part is fixedly connected to the shifting block, and an inner wall of the ejecting groove is fixedly connected to the stop block used to stop the shifting block.

Further, a receiving groove for receiving the pin is provided through a top of the ejecting part downwards, and one side of the receiving groove extends along a length direction of the ejecting part to create a space for avoiding the pin.

Further, an inner wall of the slot is provided with an opening for the ejecting part to extend out, and two ejecting surfaces in contact with the floating part are symmetrically arranged on both an upper side and a lower side of the opening.

Further, a left side wall and a right side wall of the through groove away from the shaver handle body are both provided with a limiting groove, and an outer wall of the floating part is fixedly connected to a protrusion extending into the limiting groove.

Further, an outer wall of the ejecting part is fixedly connected to a limiting block, and one side of the through groove away from the shaver handle body is fixedly connected to a limiting rod for blocking the limiting block.

Further, the first clamping piece includes a connector buckling point and a connecting groove, a top and a bottom of the push-in mechanism extending out of the clamping groove are both provided with the connecting groove, and an inner wall of the slot is fixedly connected to the connector buckling point for inserting the connecting groove.

In conclusion, the present invention has at least one of the following beneficial effects.

According to the four-way swing structure of the shaver head, a push-in mechanism assembly is provided to facilitate the replacement of a shaver head assembly. A push-in mechanism is rotatably connected to a shaver handle body by a pin, a U-shaped mounting groove is provided at a bottom of the push-in mechanism, and a U-shaped elastic piece is mounted in the U-shaped mounting groove, so that the shaver can swing not only up and down but also left and right when in use, and the shaver is automatically reset when not in use, which can avoid the problem of facial scratches caused by incorrect gripping method for the shaver handle and incorrect manipulation for shaving facial beard in the process of using the manual shaver by a consumer to the maximum extent, thereby reducing safety hazards.

BRIEF DESCRIPTION OF DRAWINGS

To more clearly illustrate the technical solutions in the embodiments of the present invention, the drawings required to be used in the description of the embodiments are briefly introduced below. It is obvious that the drawings in the description below are only some embodiments of the present invention, and those of ordinary skill in the art can obtain other drawings according to these drawings without creative efforts.

Figure 1:
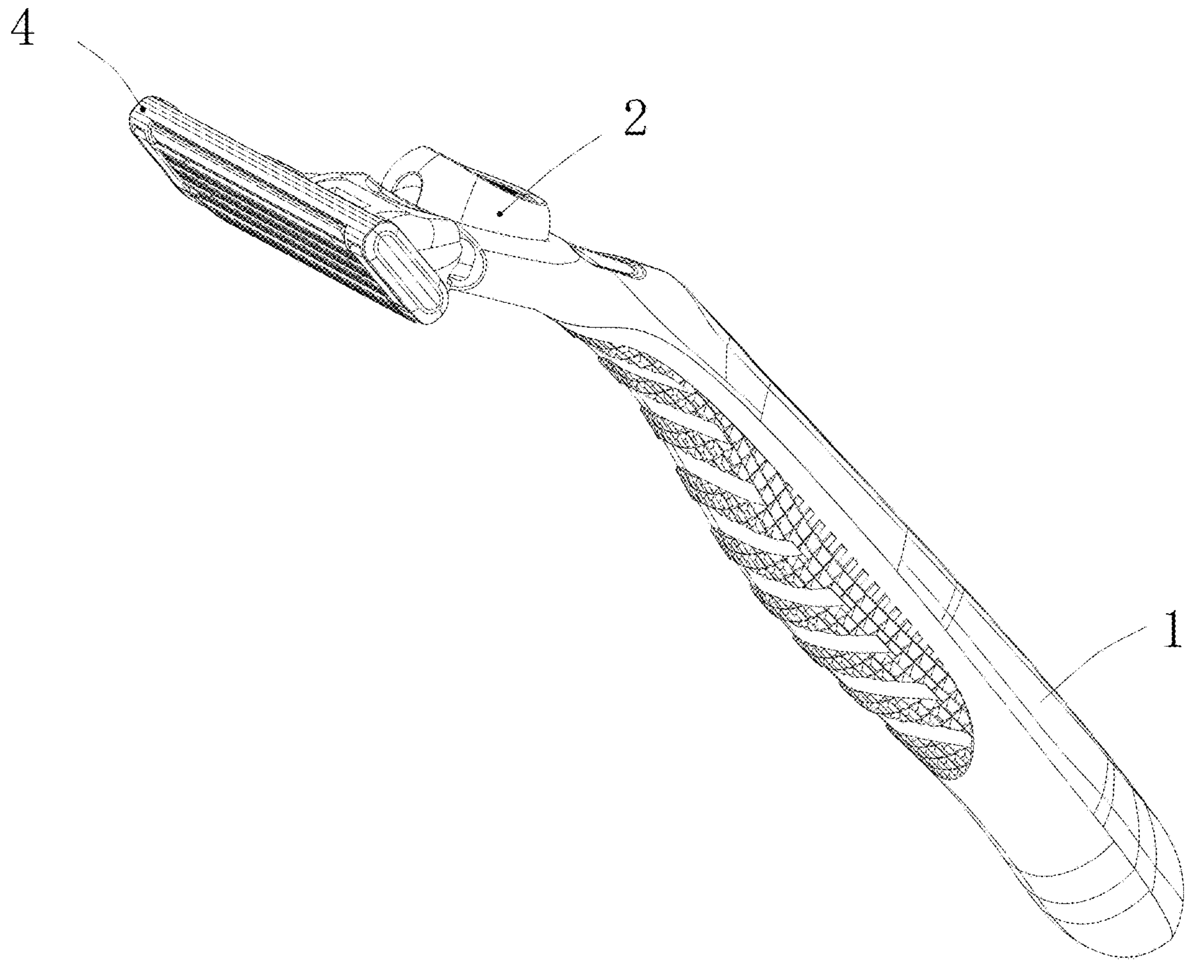
FIG. 1 is a schematic diagram of a four-way swing structure of a shaver head according to the present invention.
Figure 2:
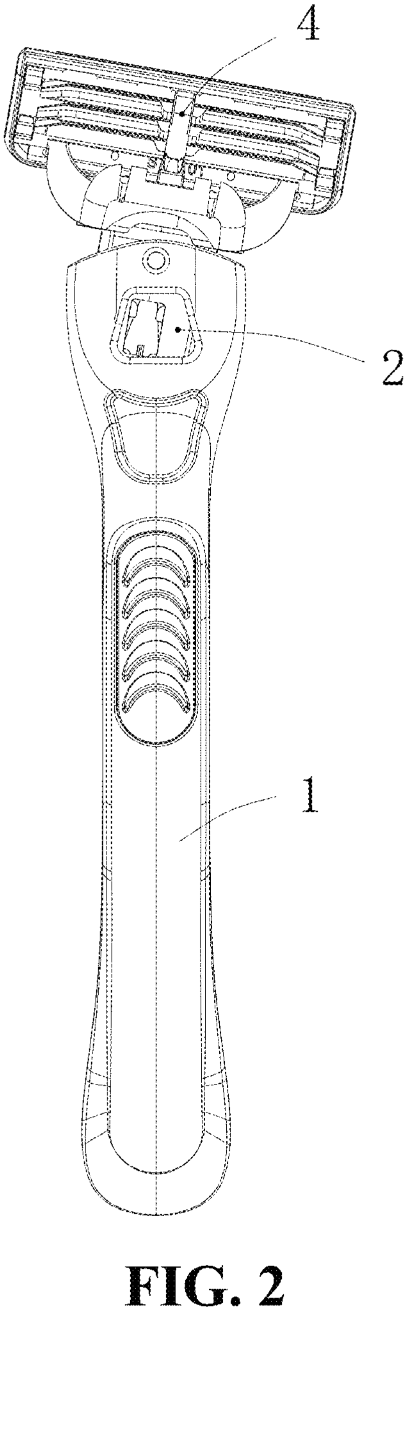
FIG. 2 is a schematic diagram of a four-way swing structure of a shaver head according to the present invention during swinging.

In the drawings, 1: shaver handle body; 2: push-in mechanism assembly; 201: push-in mechanism; 202: pushing part; 203: floating part; 204: ejecting part; 3: U-shaped elastic piece; 4: shaver head assembly; 401: horn connector; 402: shaver head; 5: clamping groove; 6: first pin hole; 7: insertion hole; 8: second pin hole; 9: pin; 10: U-shaped assembly groove; 11: slot; 12: first clamping piece; 121: connector buckling point; 122: connecting groove; 13: through groove; 14: ejecting groove; 15: spring; 16: second clamping piece; 161: shifting block; 162: stop block; 17: receiving groove; 18: opening; 19: ejecting surface; 20: limiting groove; 21: protrusion; 22: limiting block; and 23: limiting rod.

DETAILED DESCRIPTION OF EMBODIMENTS

The present invention is further described in detail below in conjunction with the accompanying drawings.

EMBODIMENT

Referring to FIGS. 1 to 7, a four-way swing structure of a shaver head disclosed by the present invention includes a shaver handle body 1, wherein a front end of the shaver handle body is provided with a clamping groove 5, a top and a bottom of the clamping groove 5 are symmetrically provided with a first pin hole 6, and a bottom wall of the clamping groove 5 is provided with two insertion holes 7;

a push-in mechanism assembly 2, wherein the push-in mechanism assembly includes a push-in mechanism 201, the push-in mechanism 201 is partially positioned in the clamping groove 5, a second pin hole 8 is vertically provided in a front end of the push-in mechanism 201, a pin 9 is rotatably connected in the second pin hole 8, and two ends of the pin 9 are each fixedly connected in the first pin hole 6;

a U-shaped elastic piece 3, wherein a U-shaped assembly groove 10 is provided in a bottom middle position of the push-in mechanism 201, a rotating section of the U-shaped elastic piece 3 is assembled in the U-shaped assembly groove 10, and an extending section of the U-shaped elastic piece 3 is horizontally inserted into the insertion hole 7; and a shaver head assembly 4, wherein the shaver head assembly includes a horn connector 401 and a shaver head 402, the shaver head 402 is rotatably connected to the horn connector 401, a slot 11 is provided on one side of the horn connector 401 away from the shaver head 402, and the slot 11 is connected to the push-in mechanism 201 through a first clamping piece 12.

In this embodiment, it can be seen from FIG. 1 that the shaver handle body 1 and the shaver head assembly 4 are arranged to be used by a user for shaving. The shaver head assembly 4 includes a horn connector 401 and a shaver head 402, and the shaver head 402 is rotatably connected to the horn connector 401, so that when the shaver head 402 fits the face, the relative rotation between the shaver head 402 and the horn connector 401 can achieve a perfect fit with the skin, thereby improving the shaving efficiency.

In the conventional manual shavers on the market, shaver heads 402 in most of the shavers rotate at a certain angle by swinging up and down around a support point to fit a facial contour and achieve the purpose of shaving. The movement direction of this structure does not fundamentally solve the problem of difficulty of shaving grip structurally, and the shaver head 402 has no effect of automatically correcting left and right directions, which poses a safety hazard during shaving.

Figure 4:
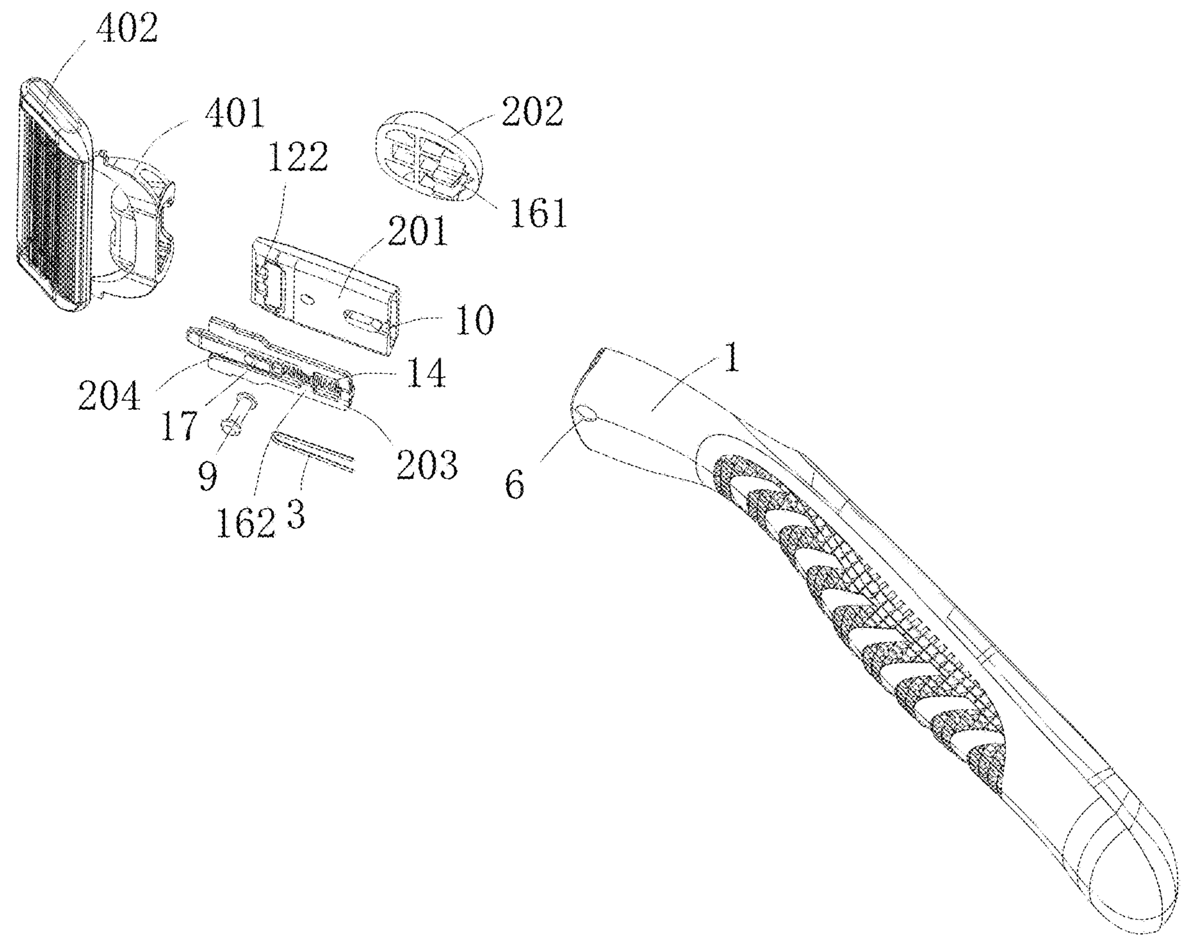
FIG. 4 is an exploded bottom view of a four-way swing structure of a shaver head according to the present invention.
Figure 5:
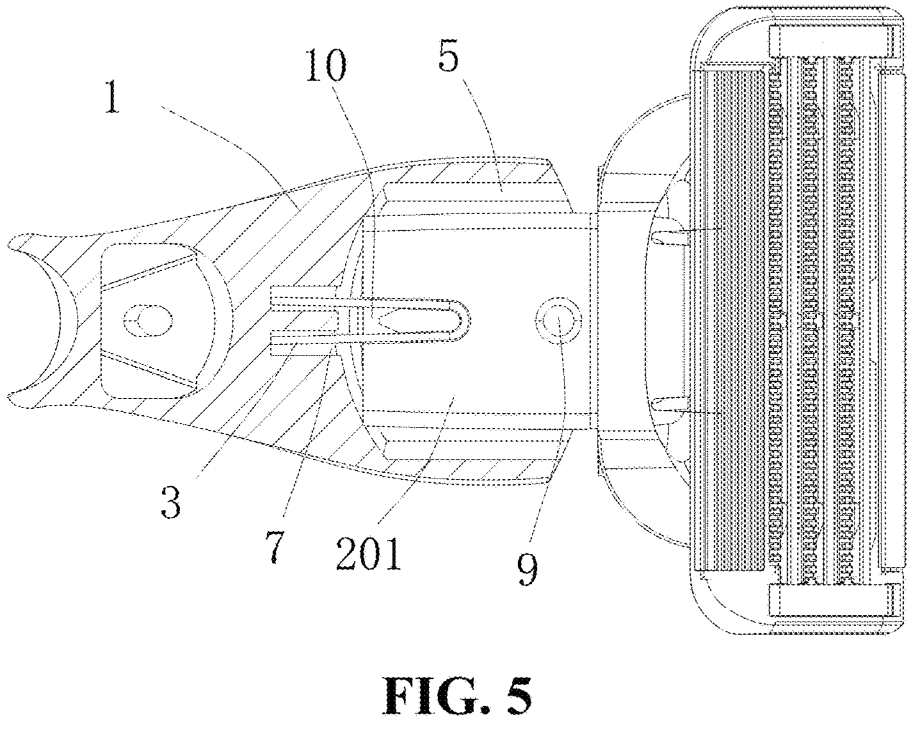
FIG. 5 is a schematic diagram of an internal structure of a clamping groove in a four-way swing structure of a shaver head according to the present invention.

Therefore, it can be seen from FIG. 4 and FIG. 5 that a clamping groove 5 is provided at a top of the shaver handle body 1, a push-in mechanism assembly 2 is arranged in the clamping groove 5 and includes a push-in mechanism 201, the push-in mechanism 201 is partially positioned in the clamping groove 5, a second pin hole 8 is vertically provided in a front end of the push-in mechanism 201, a pin 9 is rotatably connected in the second pin hole 8, and two ends of the pin 9 are each fixedly connected in the first pin hole 6, a slot 11 is provided on one side of the horn connector 401 away from the shaver head 402, and the slot 11 is connected to the push-in mechanism 201 through a first clamping piece 12, so that the shaver head assembly 4 connected to the push-in mechanism assembly can rotate along an axis of the pin 9, thereby achieving the effect of lateral swing of the shaver head assembly 4, enabling the shaver to automatically correct the shaving direction, avoiding the problem of facial scratches caused by incorrect gripping method for the shaver handle and incorrect manipulation for shaving facial beard in the process of using the manual shaver by a consumer to the maximum extent, and further reducing safety hazards.

The push-in mechanism assembly 2 is rotatably connected to the shaver handle body 1, which causes the shaking of the shaver head 402, the shaking of the shaver head 402 during shaving can affect shaving and even scratch skin seriously, and therefore, it can be seen from FIG. 5 that a U-shaped assembly groove 10 is provided in a bottom middle position of the push-in mechanism 201, a rotating section of the U-shaped elastic piece 3 is assembled in the U-shaped assembly groove 10, and an extending section of the U-shaped elastic piece 3 is horizontally inserted into the insertion hole 7, so that when the shaver head 402 can swing laterally, the U-shaped mounting groove presses the U-shaped elastic piece 3 to deform the U-shaped elastic piece 3, and then when the shaver head 402 leaves the face, the pressure on the U-shaped elastic piece 3 disappears, and the U-shaped elastic piece 3 drives the push-in mechanism 201 to reset under the action of the elastic force, which can be used to prevent the shaver head 402 from shaking during use, and can also allow the shaver head 402 to automatically return to its original position after use.

Figure 3:
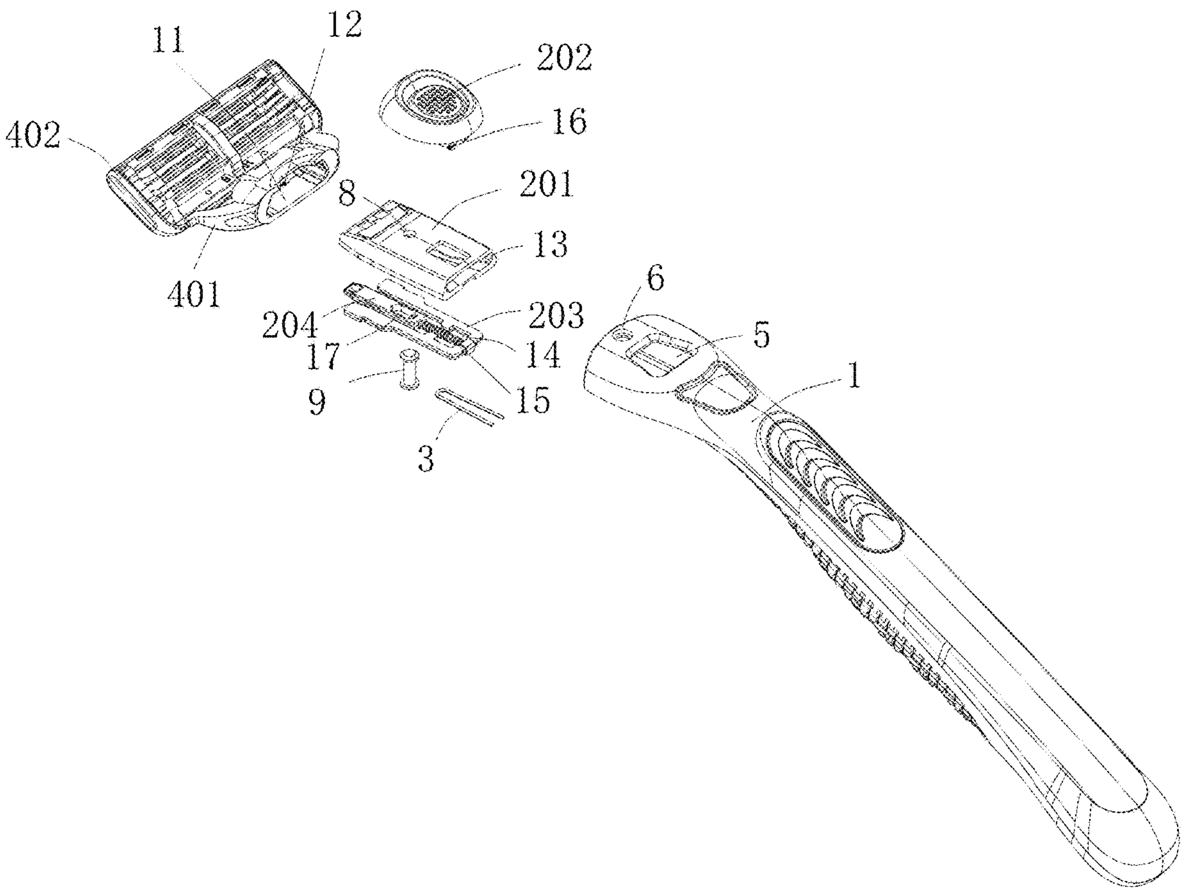
FIG. 3 is an exploded diagram of a four-way swing structure of a shaver head according to the present invention.
Figure 6:
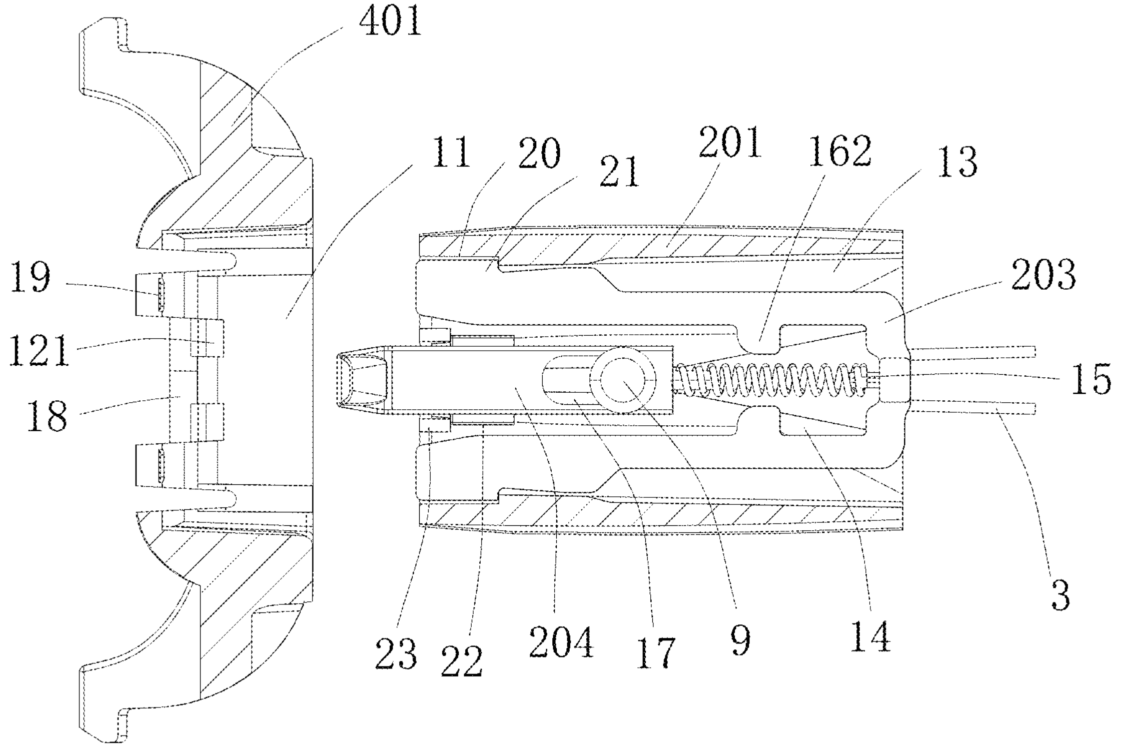
FIG. 6 is a schematic diagram of a structure of a push-in mechanism assembly in a four-way swing structure of a shaver head according to the present invention.

In a further preferred embodiment of the present invention, as shown in FIG. 3 and FIG. 6, the push-in mechanism assembly 2 further includes a pushing part 202, a floating part 203, and an ejecting part 204, a through groove 13 is provided on one side of the push-in mechanism 201 close to the insertion hole 7, the floating part 203 is slidably connected in the through groove 13, an ejecting groove 14 is concavely provided in one side of the floating part 203 away from the shaver handle body 1, a front section of the ejecting groove 14 is slidably connected to the ejecting part 204, a rear section of the ejecting groove 14 is connected to a spring 15, the spring 15 is fixedly connected to the ejecting part 204, the pushing part 202 is positioned above the shaver handle body 1, a bottom of the pushing part is inserted into the clamping groove 5 downwards and is connected to the floating part 203 by a second clamping piece 16.

In this embodiment, a through groove 13 is provided on one side of the push-in mechanism 201 close to the insertion hole 7, the floating part 203 is slidably connected in the through groove 13, the pushing part 202 is positioned above the shaver handle body 1, and a bottom of the pushing part 202 is inserted into the clamping groove 5 downwards and is connected to the floating part 203 by a second clamping piece 16. Therefore, when the pushing part 202 is pressed, the floating part 203 can be moved forward by the pushing part 202, so that the floating part 203 pushes against the horn connector 401, thereby unlocking the first clamping piece 12, and achieving the effect of quickly replacing the shaver head 402.

Since the rotational connection between the shaver head 402 and the horn connector 401 causes shaking between the shaver head 402 and the horn connector 401, thereby affecting the shaving of the shaver head 402, an ejecting groove 14 is concavely provided in one side of the floating part 203 away from the shaver handle body 1, a front section of the ejecting groove 14 is slidably connected to the ejecting part 204, a rear section of the ejecting groove 14 is connected to a spring 15, the spring 15 is fixedly connected to the ejecting part 204, and the ejecting part 204 can be provided to press the shaver head 402 under the action of the spring 15, so that the shaver head 402 always maintains an angle when not in use.

In a further preferred embodiment of the present invention, as shown in FIG. 4, the second clamping piece 16 includes a shifting block 161 and a stop block 162, a bottom of the pushing part 202 is fixedly connected to the shifting block 161, and an inner wall of the ejecting groove 14 is fixedly connected to the stop block 162 used to stop the shifting block 161.

In this embodiment, a bottom of the pushing part 202 is fixedly connected to the shifting block 161, and an inner wall of the ejecting groove 14 is fixedly connected to the stop block 162 used to stop the shifting block 161, so that the floating part 203 can be driven to move when the pushing part 202 is pushed, which has the effect of pushing against the horn connector 401, thereby achieving the effect of rapid replacement of the shaver head assembly 4.

In a further preferred embodiment of the present invention, as shown in FIG. 6, a receiving groove 17 for receiving the pin 9 is provided through a top of the ejecting part 204 downwards, and one side of the receiving groove 17 extends along a length direction of the ejecting part 204 to create a space for avoiding the pin 9.

In this embodiment, since the push-in mechanism 201 rotates around the pin 9, and the ejecting part 204 is arranged in the push-in mechanism 201, the ejecting part 204 abuts against the pin 9 during rotation, thus affecting the lateral swing of the shaver head 402. Therefore, it can be seen from FIG. 6 that a receiving groove 17 for receiving the pin 9 is provided at the top of the ejecting part 204, so that when the shaver head 402 swings laterally, the ejecting part 204 also rotates around an axis of the pin 9, thereby avoiding the ejecting part 204 from abutting against the pin 9 and ensuring the stability of the lateral swing of the shaver head 402.

Since the ejecting part 204 needs to slide in the through groove 13, to prevent the pin 9 from blocking the sliding of the ejecting part 204, one side of the receiving groove 17 extends along the length direction of the ejecting part 204 to form a space for avoiding the pin 9, thereby ensuring the stability of the ejecting part 204 in use.

Figure 7:
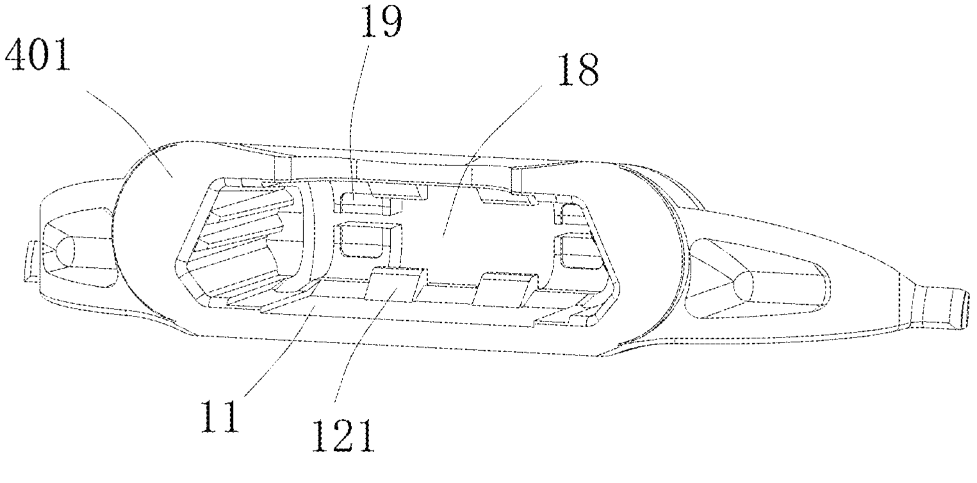
FIG. 7 is a schematic diagram of a structure of a horn connector in a four-way swing structure of a shaver head according to the present invention.

In a further preferred embodiment of the present invention, as shown in FIG. 6 and FIG. 7, an inner wall of the slot 11 is provided with an opening 18 for the ejecting part 204 to extend out, and two ejecting surfaces 19 in contact with the floating part 203 are symmetrically arranged on both an upper side and a lower side of the opening 18.

In this embodiment, since the horn connector 401 is connected to the push-in mechanism 201 through the first clamping piece 12, and the ejecting part 204 needs to push against the shaver head 402, the slot 11 of the horn connector 401 is provided with opening 18, so that the ejecting part 204 can pass through the opening 18 to push against the shaver head 402, thereby ensuring stable operation of the ejecting part 204.

Two ejecting surfaces 19 in contact with the floating part 203 are arranged on an upper side and a lower side of the opening 18. The two ejecting surfaces 19 are symmetrically arranged on two sides of the opening 18, so that when the pushing part 202 is pushed, the floating member 203 can be driven to push against the ejecting surfaces 19 to unlock the clamping piece 12, thereby achieving a quick replacement effect of the shaver head assembly 4.

In a further preferred embodiment of the present invention, as shown in FIG. 6, a left side wall and a right side wall of the through groove 13 away from the shaver handle body 1 are both provided with a limiting groove 20, and an outer wall of the floating part 203 is fixedly connected to a protrusion 21 extending into the limiting groove 20.

In this embodiment, the ejecting groove 14 of the floating part 203 is connected to the ejecting part 204 by the spring 15, and the ejecting part 204 abuts against the shaver head 402, so that the floating part 203 slides towards the depth of the clamping groove 5 under the pushing of the spring 15. Therefore, to avoid the floating part 203 from moving too deep into the clamping groove 5, the floating part 203 is separated from the horn connector 401, which affects the replacement efficiency of the shaver head assembly 4, a left side wall and a right side wall of the through groove 13 away from the shaver handle body 1 are both provided with a limiting groove 20, and an outer wall of the floating part 203 is fixedly connected to a protrusion 21 extending into the limiting groove 20.

In a further preferred embodiment of the present invention, as shown in FIG. 6, an outer wall of the ejecting part 204 is fixedly connected to a limiting block 22, and one side of the through groove 13 away from the shaver handle body 1 is fixedly connected to a limiting rod 23 for blocking the limiting block 22.

In this embodiment, since the spring 15 is arranged between the ejecting part 204 and the floating part 203, the ejecting part 204 continuously pushes against the shaver head 402, so that when the shaver head assembly 4 is replaced, the ejecting part 204 may pop up due to losing support, which may affect the use of the shaver. Therefore, it can be seen from FIG. 6 that an outer wall of the ejecting part 204 is fixedly connected to a limiting block 22, and one side of the through groove 13 away from the shaver handle body 1 is fixedly connected to a limiting rod 23 for blocking the limiting block 22, so that when the shaver head assembly 4 is replaced, the limiting block 22 on the ejecting part 204 is blocked by the limiting rod 23, which can effectively prevent the ejecting 204 from flying out.

In a further preferred embodiment of the present invention, as shown in FIG. 3, FIG. 4, and FIG. 7, the first clamping piece 12 includes a connector buckling point 121 and a connecting groove 122, a top and a bottom of the push-in mechanism 201 extending out of the clamping groove 5 are both provided with the connecting groove 122, and an inner wall of the slot 11 is fixedly connected to the connector buckling point 121 for inserting the connecting groove 122.

In this embodiment, it can be seen from FIG. 3, FIG. 4, and FIG. 7 that a top and a bottom of one side of the push-in mechanism 201 extending out of the clamping groove 5 are both provided with the connecting groove 122, and an inner wall of the slot 11 is fixedly connected to the connector buckling point 121 for inserting the connecting groove 122, so that when the shaver head assembly 4 is mounted, the shaver head assembly can be fixed by using a plurality of points, and the mounting stability of the shaver head assembly 4 can be effectively improved.

The embodiments of this specific implementation are all preferred embodiments of the present invention and are not intended to limit the protection scope of the present invention. Therefore, all equivalent changes made based on the structure, shape, and principle of the present invention shall fall within the protection scope of the present invention.

What is claimed is:

1. A four-way swing structure of a shaver head, comprising: a shaver handle body (1), wherein a front end of the shaver handle body is provided with a clamping groove (5), a top and a bottom of the front end of the shaver handle body are symmetrically provided with a pair of first pin holes (6), and a bottom wall of the clamping groove (5) is provided with two insertion holes (7);

a push-in mechanism assembly (2), wherein the push-in mechanism assembly comprises a push-in mechanism (201), the push-in mechanism (201) is partially positioned in the clamping groove (5), a second pin hole (8) is vertically provided in a front end of the push-in mechanism (201), a pin (9) is rotatably connected in the second pin hole (8), and two ends of the pin (9) are fixedly connected in the pair of first pin holes (6);

a U-shaped elastic piece (3), wherein a U-shaped assembly groove (10) is provided in a bottom middle position of the push-in mechanism (201), a curved section of the U-shaped elastic piece (3) is assembled in the U-shaped assembly groove (10), and an extending section of the U-shaped elastic piece (3) is horizontally inserted into either of the two insertion holes (7); and a shaver head assembly (4), wherein the shaver head assembly comprises a horn connector (401) and a shaver head (402), the shaver head (402) is rotatably connected to the horn connector (401), a slot (11) extends from one side of the horn connector (401) away from the shaver head (402) to an interior of the horn connector, and the slot (11) is connected to the push-in mechanism (201), the shaver head assembly connected to the push-in mechanism assembly is capable of rotating around an axis of the pin, such that the shaver head assembly is capable of swinging laterally, when the shaver head assembly swings laterally, the U-shaped elastic piece is deformed by a pressure of the U-shaped mounting groove, and when the pressure disappears, the shaver head assembly connected to the push-in mechanism assembly is driven to reset by an elastic force of the U-shaped elastic piece.

2. The four-way swing structure of the shaver head according to claim 1, wherein the push-in mechanism assembly (2) further comprises a pushing part (202), a floating part (203), and an ejecting part (204), a through groove (13) is provided on one side of the push-in mechanism (201) close to the insertion hole (7), the floating part (203) is slidably connected in the through groove (13), an ejecting groove (14) is concavely provided in one side of the floating part (203) away from the shaver handle body (1), a front section of the ejecting groove (14) is slidably connected to the ejecting part (204), a rear section of the ejecting groove (14) is connected to a spring (15), the spring (15) is fixedly connected to the ejecting part (204), the pushing part (202) is positioned above the shaver handle body (1), a bottom of the pushing part is inserted into the clamping groove (5) downwards and is connected to the floating part (203) by a clamping piece (16).

3. The four-way swing structure of the shaver head according to claim 2, wherein the clamping piece (16) comprises a shifting block (161) and a stop block (162), a bottom of the pushing part (202) is fixedly connected to the shifting block (161), and an inner wall of the ejecting groove (14) is fixedly connected to the stop block (162) configured to engage with the shifting block (161), the pushing part (202) drives the shifting block (161) to move, the shifting block (161) drives the stop block (162) to move, the stop block (162) drives the floating part (203) to move, such that the floating part (203) pushes against the horn connector (401).

4. The four-way swing structure of the shaver head according to claim 2, wherein a receiving groove (17) for receiving the pin (9) is provided through a top of the ejecting part (204) downwards, and one side of the receiving groove (17) extends along a length direction of the ejecting part (204).

5. The four-way swing structure of the shaver head according to claim 2, wherein an inner wall of the slot (11) is provided with an opening (18) for the ejecting part (204) to extend out, and two ejecting surfaces (19) in contact with the floating part (203) are symmetrically arranged on both an upper side and a lower side of the opening (18), the two ejecting surfaces (19) partially cover the opening (18).

6. The four-way swing structure of the shaver head according to claim 2, wherein a left side wall and a right side wall of the through groove (13) away from the shaver handle body (1) are both provided with a limiting groove (20), and an outer wall of the floating part (203) is fixedly connected to a protrusion (21) extending into the limiting groove (20).

7. The four-way swing structure of the shaver head according to claim 2, wherein an outer wall of the ejecting part (204) is fixedly connected to a limiting block (22), and one side of the through groove (13) away from the shaver handle body (1) is fixedly connected to a limiting rod (23) for blocking the limiting block (22).

8. The four-way swing structure of the shaver head according to claim 1, wherein a top and a bottom of the push-in mechanism (201) extending out of the clamping groove (5) are both provided with a connecting groove (122), and an inner wall of the slot (11) is provided with a connector buckling point (121) for inserting into the connecting groove (122).

9. The four-way swing structure of the shaver head according to claim 1, wherein the U-shaped elastic piece comprises two extending sections connected by the curved section, each extending section is inserted into a corresponding insertion hole.

10. The four-way swing structure of the shaver head according to claim 1, wherein a protrusion is provided in the U-shaped assembly groove, the curved section of the U-shaped elastic piece embraces the protrusion.

* * * * *